United States Patent
Li et al.

(10) Patent No.: US 11,421,660 B2
(45) Date of Patent: Aug. 23, 2022

(54) VIDEO MONITORING METHOD AND SYSTEM FOR WIND TURBINE BLADE

(71) Applicant: BEIJING GOLDWIND SCIENCE & CREATION WINDPOWER EQUIPMENT CO., LTD., Beijing (CN)

(72) Inventors: Xinle Li, Beijing (CN); Boyu Yang, Beijing (CN)

(73) Assignee: BEIJING GOLD WIND SCIENCE & CREATION WINDPOWER EQUIPMENT CO., LTD., Beijing (CN)

( * ) Notice: Subject to any disclaimer, the term of this patent is extended or adjusted under 35 U.S.C. 154(b) by 0 days.

(21) Appl. No.: 17/289,704

(22) PCT Filed: Jun. 21, 2019

(86) PCT No.: PCT/CN2019/092198
§ 371 (c)(1),
(2) Date: Apr. 28, 2021

(87) PCT Pub. No.: WO2020/087946
PCT Pub. Date: May 7, 2020

(65) Prior Publication Data
US 2022/0003212 A1 Jan. 6, 2022

(30) Foreign Application Priority Data
Oct. 31, 2018 (CN) .......................... 201811288130.4

(51) Int. Cl.
*F03D 17/00* (2016.01)
*H04N 5/232* (2006.01)
*H04N 7/18* (2006.01)

(52) U.S. Cl.
CPC .......... *F03D 17/00* (2016.05); *H04N 5/23296* (2013.01); *H04N 5/23299* (2018.08); *H04N 7/18* (2013.01); *F05B 2270/8041* (2013.01)

(58) Field of Classification Search
None
See application file for complete search history.

(56) References Cited

U.S. PATENT DOCUMENTS 8,041,540 B2 * 10/2011 Kerber ................ F03D 17/00
702/56
10,584,683 B2 * 3/2020 Lysgaard .................. G01P 5/26
(Continued)

FOREIGN PATENT DOCUMENTS

CA 2732406 A1 * 8/2011 ............. F03D 17/00
CN 102192717 A * 9/2011 ............. F03D 17/00
(Continued)

OTHER PUBLICATIONS

Baqersad, Javad & Poozesh, Peyman & Niezrecki, Christopher & Harvey, Eric & Yarala, Rahul. (2014). Full Field Inspection of a Utility Scale Wind Turbine Blade Using Digital Image Correlation. 10.13140/2.1.2891.2960. (Year: 2014).*
(Continued)

*Primary Examiner* — Stefan Gadomski
(74) *Attorney, Agent, or Firm* — Bayes PLLC (57) ABSTRACT

A video monitoring method and system for a blade of a wind turbine are provided. The method includes: calculating a pan value and a tilt value based on each of a plurality of circular arc angles when the blade of the wind turbine is in a stationary state, wherein the plurality of circular arc angles are set based on a circular arc curve on a rotational plane of the blade, which is formed with a first point as a center and a first distance as a radius; and setting the pan value and the (Continued)

tilt value of a video camera to the calculated pan value and tilt value, respectively, to capture the blade.

20 Claims, 7 Drawing Sheets

(56) References Cited

U.S. PATENT DOCUMENTS

| | | | | |
|---|---|---|---|---|
| 10,815,966 | B1* | 10/2020 | Burns | G05B 15/02 |
| 2009/0266160 | A1* | 10/2009 | Jeffrey | F03D 17/00 |
| | | | | 73/455 |
| 2010/0084864 | A1* | 4/2010 | Lucks | F03D 7/0288 |
| | | | | 290/44 |
| 2011/0049886 | A1* | 3/2011 | Becker | F03D 17/00 |
| | | | | 290/44 |
| 2011/0103933 | A1* | 5/2011 | Olesen | F03D 17/00 |
| | | | | 415/118 |
| 2011/0205348 | A1* | 8/2011 | Fritz | G01M 5/0091 |
| | | | | 348/61 |
| 2011/0206511 | A1* | 8/2011 | Frydendal | F03D 7/0224 |
| | | | | 416/61 |
| 2012/0076345 | A1* | 3/2012 | Fritz | F03D 80/50 |
| | | | | 382/100 |
| 2013/0300855 | A1* | 11/2013 | Fritz | G01N 21/954 |
| | | | | 348/82 |
| 2014/0184794 | A1* | 7/2014 | Coombs | G01N 21/954 |
| | | | | 702/188 |
| 2014/0267693 | A1* | 9/2014 | Newman | G01N 25/72 |
| | | | | 348/128 |
| 2014/0356164 | A1* | 12/2014 | Asheim | F03D 17/00 |
| | | | | 416/61 |
| 2015/0043769 | A1* | 2/2015 | Newman | F03D 17/00 |
| | | | | 382/100 |
| 2015/0116131 | A1* | 4/2015 | Ikeda | G05B 23/0235 |
| | | | | 340/870.07 |
| 2016/0017866 | A1* | 1/2016 | Craft | H04N 7/185 |
| | | | | 348/46 |
| 2016/0040655 | A1* | 2/2016 | Kötting | F03D 80/88 |
| | | | | 416/61 |
| 2016/0055400 | A1* | 2/2016 | Jorquera | F03D 17/00 |
| | | | | 416/61 |
| 2016/0063350 | A1* | 3/2016 | Newman | G01N 21/9515 |
| | | | | 348/125 |
| 2017/0249511 | A1 | 8/2017 | Newman | |
| 2018/0003161 | A1* | 1/2018 | Michini | G06T 7/0004 |
| 2018/0273173 | A1* | 9/2018 | Moura | G05D 1/0088 |
| 2019/0024628 | A1* | 1/2019 | De Barros | F03D 1/0633 |
| 2019/0072082 | A1* | 3/2019 | Lysgaard | F03D 7/0204 |
| 2019/0130768 | A1* | 5/2019 | Clark | G08G 5/0086 |
| 2019/0226457 | A1* | 7/2019 | Bertolotti | F03D 17/00 |
| 2019/0370999 | A1* | 12/2019 | Liu | G06T 7/181 |
| 2020/0018291 | A1* | 1/2020 | Rosen | F03D 17/00 |
| 2020/0025176 | A1* | 1/2020 | Georgeson | F03D 17/00 |
| 2020/0260013 | A1* | 8/2020 | Kaufmann | F03D 17/00 |
| 2020/0293045 | A1* | 9/2020 | Ghiglino Novoa | F03D 17/00 |

FOREIGN PATENT DOCUMENTS

| | | | | |
|---|---|---|---|---|
| CN | 102539438 | A | 7/2012 | |
| CN | 102706885 | A | 10/2012 | |
| CN | 103335604 | A | 10/2013 | |
| CN | 108152295 | A | 6/2018 | |
| CN | 108459027 | A | 8/2018 | |
| DE | 102011016868 | A1 * | 10/2011 | F03D 17/00 |
| DE | 102011088447 | A1 * | 6/2013 | F03D 11/0091 |
| DE | 102012203455 | A1 * | 9/2013 | F03D 17/00 |
| DE | 102013110898 | A1 * | 8/2014 | F03D 17/00 |
| DE | 102014014386 | A1 * | 4/2016 | F03D 17/00 |
| DE | 102016108954 | A1 * | 11/2017 | F03D 17/00 |
| DK | 201670147 | A1 * | 8/2017 | |
| EP | 2357359 | A2 * | 8/2011 | F03D 17/00 |
| EP | 2481924 | A1 | 8/2012 | |
| EP | 2853729 | A1 * | 4/2015 | F03D 17/00 |
| EP | 2887030 | A1 * | 6/2015 | F03D 17/00 |
| EP | 3002455 | A1 * | 4/2016 | F03D 17/00 |
| EP | 3279470 | A1 * | 2/2018 | F03D 17/00 |
| EP | 3343030 | A1 * | 7/2018 | F03D 17/00 |
| EP | 3457326 | A4 * | 9/2019 | F03D 17/00 |
| JP | 2011127605 | A * | 6/2011 | |
| JP | 2014519024 | A * | 8/2014 | |
| KR | 10-2014-0000612 | A | 1/2014 | |
| WO | WO-2009129617 | A1 * | 10/2009 | F03D 1/008 |
| WO | WO-2011163498 | A2 * | 12/2011 | F03D 1/003 |
| WO | WO-2012097475 | A1 * | 7/2012 | F03D 11/0091 |
| WO | WO-2012152561 | A1 * | 11/2012 | F03D 17/00 |
| WO | WO-2014145537 | A1 * | 9/2014 | F03D 17/00 |
| WO | WO-2014187463 | A1 * | 11/2014 | F03D 1/0675 |
| WO | WO-2016033181 | A1 * | 3/2016 | B60R 11/04 |
| WO | WO-2016169959 | A1 * | 10/2016 | F03D 17/00 |

OTHER PUBLICATIONS

D. Y. Kim, H.-B. Kim, W. S. Jung, S. Lim, J.-H. Hwang and C.-W. Park, "Visual testing system for the damaged area detection of wind power plant blade," IEEE ISR 2013, 2013, pp. 1-5, doi: 10.1109/ISR.2013.6695675. (Year: 2013).*

International Search Report in corresponding International Application No. PCT/CN2019/092198, dated Sep. 19, 2019 (5 pages).

First Office Action in corresponding Chinese Application No. 201811288130.4, dated Aug. 20, 2020 (12 pages).

First Examination Report in corresponding India Application No. 202117021493, dated Feb. 23, 2022 (6 pages).

* cited by examiner

VIDEO MONITORING METHOD AND SYSTEM FOR WIND TURBINE BLADE

CROSS-REFERENCE TO RELAYED APPLICATIONS

The present application is a national phase of International Application No. PCT/CN2019/092198, filed on Jun. 21, 2019, which claims priority to Chinese Patent Application No. 201811288130.4, filed on Oct. 31, 2018 with the China National Intellectual Property Administration. The entire contents of each of the above-identified applications are incorporated herein by reference.

TECHNICAL FIELD

The following description relates to the field of wind power, more specifically, to a video monitoring method and system for a blade of a wind turbine.

BACKGROUND

A blade of a wind turbine has an elastomeric structure with a short spanwise direction and a long chordwise direction. As a key component for wind energy absorption, the blade will be prone to vibration and deformation, thereby affecting smooth operation of the wind turbine. Due to complex and changeable operating environments of the wind turbine, a load to which the blade is subjected is large and varies largely in magnitude, during long-term operation, the blade will have different degrees of cracks or deformation, and a failure rate due to blade problems is above 30%. It is therefore important to monitor the blade.

The related art mainly uses a video measurement method to monitor the blade. This video measurement method obtains a displacement and a deformation of each marker point under load by calculating 3D coordinates of marker points of each frame, which has been widely used for non-contact measurement of the blade. However, due to characteristics of high torque and high rotation speed of the blade of wind turbine, image matching directly through marker points is likely to fail to find sub-regions which are similar to each other before and after the deformation, resulting in an unsuccessful matching, thus it is impossible to effectively monitor the blade.

In addition, in the related art, a video camera or a camera used to monitor the blade are usually disposed on the ground or on a side of a nacelle, however, since a diameter of an impeller of a current large megawatt wind turbine is very large (diameters of some impellers are even above 70 meters), and the blade itself has a characteristic of an aerodynamic shape, a relative position between the video camera or the camera and the blade arranged in this way will restrict shooting, result in reduced safety and/or make it impossible to capture an overall image of the blade simply and quickly.

SUMMARY

In order to solve at least one of problems described above, the disclosure provides a video monitoring method and system for a blade of a wind turbine.

According to one aspect of the disclosure, a video monitoring method for a blade of a wind turbine is provided. The method includes: calculating a pan value and a tilt value based on each of a plurality of circular arc angles when the blade of the wind turbine is in a stationary state, wherein the plurality of circular arc angles are set based on a circular arc curve on a rotational plane of the blade, which is formed with a first point as a center and a first distance as a radius, wherein the first point is an intersection of a spindle of the wind turbine with the rotational plane of the blade, and the first distance is a distance from the first point to a monitoring part on the blade; and setting the pan value and the tilt value of a video camera to the calculated pan value and tilt value, respectively, to capture the blade.

According to another aspect of the disclosure, a computer-readable storage medium is provided. The computer-readable storage medium may store program instructions that, when executed by a processor, cause the processor to perform the method as described above.

According to another aspect of the disclosure, a computing device is provided. The computing device may include: a processor; and a memory storing program instructions that, when executed by a processor, cause the processor to perform the method as described above.

According to another aspect of the application, a video monitoring system for a blade of a wind turbine is provided. The system includes: a video camera mounted at a top of a nacelle of the wind turbine; and a processor configured to: calculate a pan value and a tilt value based on each of a plurality of circular arc angles when the blade of the wind turbine is in a stationary state, wherein the plurality of circular arc angles are set based on a circular arc curve on a rotational plane of the blade, which is formed with a first point as a center and a first distance as a radius, wherein the first point is an intersection of a spindle of the wind turbine with the rotational plane of the blade, and the first distance is a distance from the first point to a monitoring part on the blade; and wherein the video camera adjusts the pan value and the tilt value to the pan value and the tilt value calculated by the processor, respectively, to capture the blade.

The video monitoring method and system for the blade of the wind turbine according to example embodiments are capable of capturing the blade when the blade is in a stationary state and in a state of motion respectively, performing a fixed-point segmentation shooting when the blade is in the state of motion, and performing the shooting according to a motion trajectory when the blade is in the stationary state; thereby simply and quickly capturing a clear maximum area of the blade or capturing an outer surface of an entire blade body.

BRIEF DESCRIPTION OF DRAWINGS

Throughout the drawings, the same or similar reference numerals will refer to the same or similar elements. The drawings may not be to scale and, for clarity, illustration and convenience, the relative size, portions and depiction of the elements in the drawings may be exaggerated.

DETAILED DESCRIPTION

The disclosure may have various variations and various embodiments, and it should be understood that the disclosure is not limited to these embodiments, but includes all variations, equivalents, and alternatives within the spirit and scope of the disclosure. For example, the sequences of operations described herein are merely examples, and are not limited to those set forth herein, but may be changed as will be apparent after an understanding of the disclosure of this application, with the exception of operations necessarily occurring in a certain order. In addition, descriptions of features that are known in the art may be omitted for increased clarity and conciseness. The terminology used in example embodiments of the disclosure is only used to describe specific embodiments, but is not intended to limit the example embodiments. The singular forms "a", "an", and "the" are intended to include the plural forms as well, unless the context clearly indicates otherwise.

It will be understood that, although the terms "first", "second", "third", etc. may be used in the specification to describe various elements, these elements should not be limited by these terms. These terms are only used to distinguish one element from another element. For example, a first element may also be referred to as a second element, and similarly, a second element may also be referred to as a first element, without departing from the spirit and scope of the disclosure.

Figure 1A:
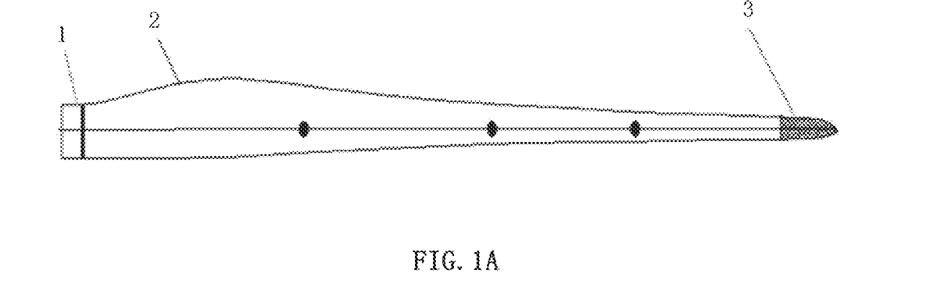
FIGS. 1A to 1C are schematic diagrams showing a basic structure of a blade of a wind turbine.
Figure 1B:
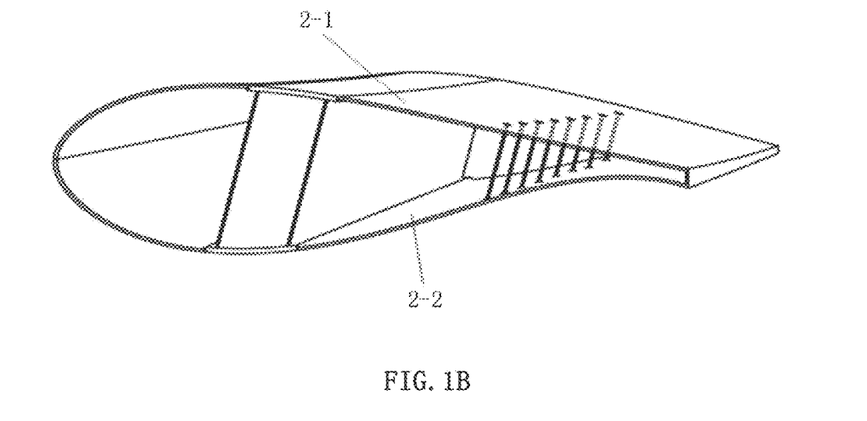
Figure 1C:
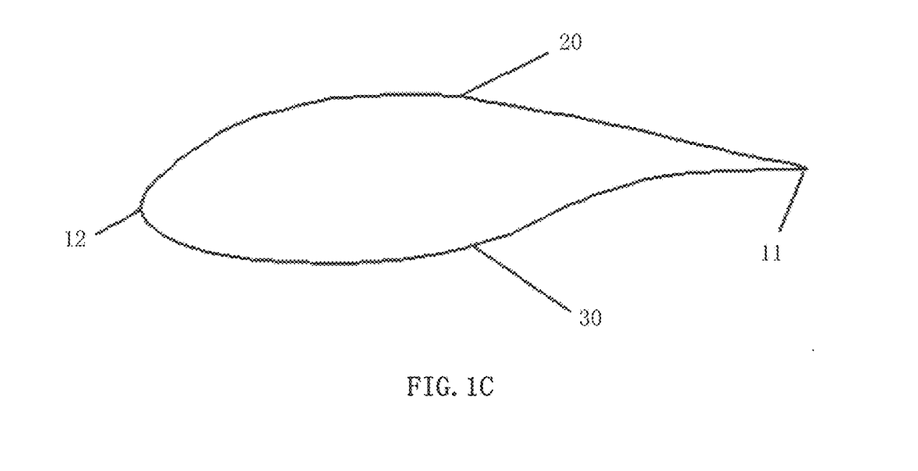

FIGS. 1A to 1C are schematic diagrams showing a basic structure of a blade of a wind turbine.

Referring to FIG. 1A, the blade include a blade root 1 closest to a wheel hub of the wind turbine, a blade tip 3 furthest from the wheel hub, and a blade wing 2 between the blade root 1 and the blade tip 3. The blade tip 3 has an aerodynamic shape, while a cross-section of the blade root 1 is roughly circular, so that an air gust load is reduced and it is easier to mount the blade to the wheel hub. A profile shape of the blade wing 2 gradually changes from the circular shape of the blade root 1 to the aerodynamic shape of the blade tip 3. A cross-section of the blade wing 2 is shown in FIGS. 1B and 1C. Referring to FIGS. 1B and 1C, the blade wing 2 has an upper housing 2-1 (corresponding to a suction surface 20) and a lower housing 2-2 (corresponding to a pressure surface 30), and a leading edge 12 and a trailing edge 11. The suction surface 20 is a circular arc surface, also known as a leeward surface; the pressure surface 30 is a slightly S-shaped surface, also known as a windward surface; the leading edge 12 is in a shape of an obtuse rounded head; and the trailing edge 11 is in a shape of a pointed head.

Figure 2A:
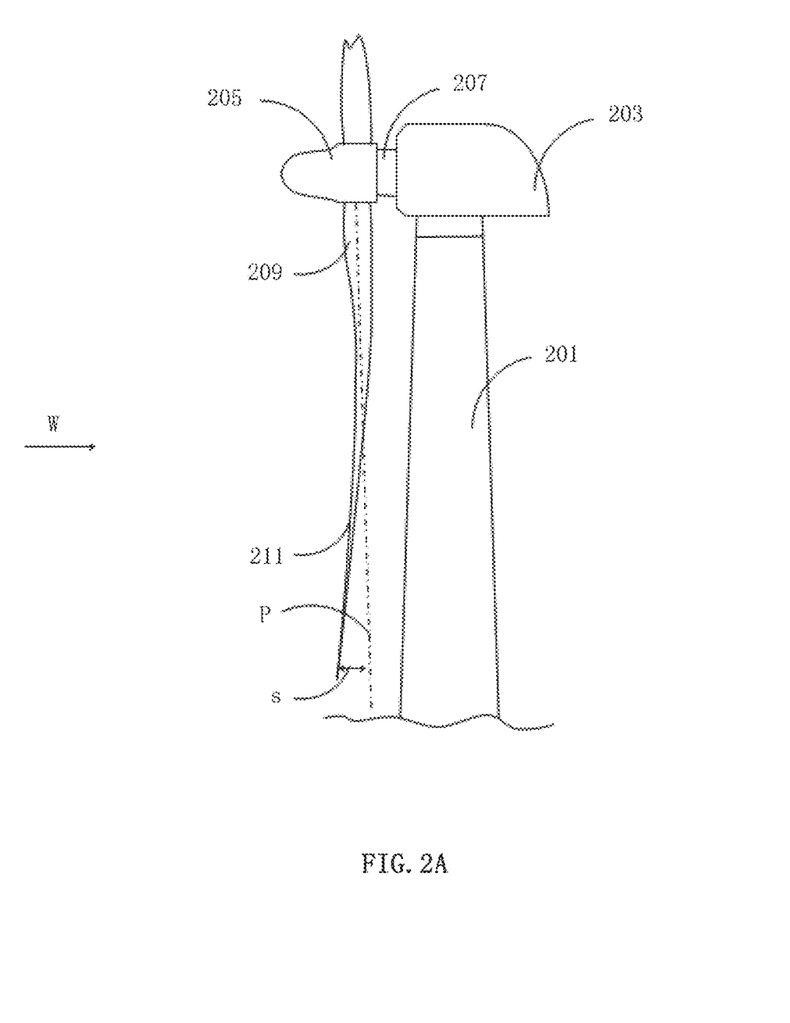
FIG. 2A shows a diagram of a structure of a wind turbine.

FIG. 2A shows a diagram of a structure of a wind turbine.

Referring to FIG. 2A, the wind turbine includes a tower 201, a nacelle 203, a wheel hub 205, and a spindle 207. A blade rotates towards a wind direction W and wind pressure causes the blade to bend backwards and bend inwards towards the tower 201. To prevent the blade tip 211 from impacting the tower 201, the blade tip 211 is disposed to bend forwards. When the blade is stationary, the blade tip 211 will be located at a distance s in front of a plane P formed by the blade root 209.

Figure 2B:
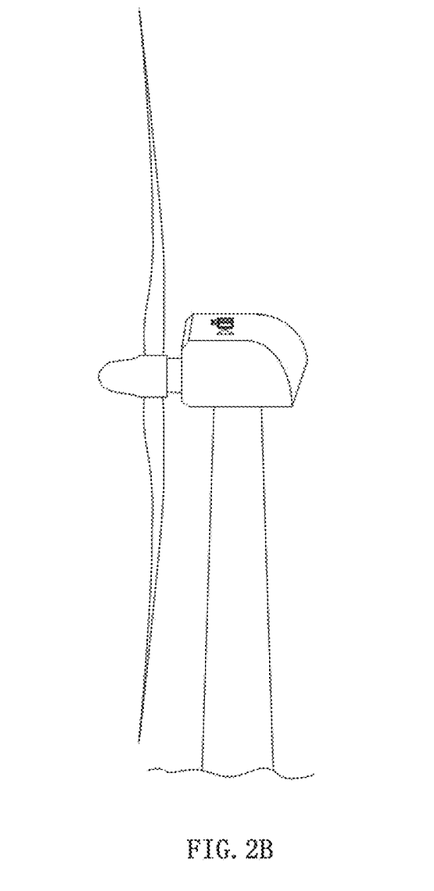
FIG. 2B shows a schematic diagram of a mounting location of a video camera according to an example embodiment.

FIG. 2B shows a schematic diagram of a mounting location of a video camera according to an example embodiment.

According to an example embodiment of the disclosure, the video camera for capturing blades is mounted at a top of the nacelle of the wind turbine. As a preferred embodiment, the video camera is mounted on a wind measurement bracket at the top of the nacelle of the wind turbine.

Referring to FIG. 2A, since the blade tip 211 of the blade bends outwards, the video camera is mounted at the top of the nacelle (as shown in FIG. 2B) so as to be able to capture the blade root and blade wing over a large area, but does not facilitate capturing an image of the blade tip 211; however, the blade tip 211 is susceptible to damage due to lightning stroke, so it is extremely important to monitor the blade tip 211. For megawatt wind turbine, a diameter of an impeller is very large (diameters of some impellers are even above 70 meters), a linear velocity at which the blade tip 211 moves is very fast, so that the blade tip 211 is captured only in a few frames among images captured by the video camera, which makes monitoring of the blade tip 211 to be difficult. In addition, the video camera is mounted at the top of the nacelle, behind the impeller, and cannot capture both upper and lower housings of the blade, that is, the video camera cannot capture an image of the overall blade at the same time.

As described above, a relative position of the video camera and the blade will limit shooting, so a video monitoring method and a system for a blade of a wind turbine according to an example embodiment are intended to adjust a shooting angle and a camera magnification factor of the video camera, so as to control the video camera (e.g., a camera, or preferably a PTZ (Pan-Tilt-Zoom) camera rotating by 360 degrees) to easily and quickly capture a clear maximum area of the blade (e.g., an outer surface of the entire blade as shown in FIGS. 1A to 1C) when the blades are stationary as well as in motion to obtain an optimal image of the blade. The video monitoring method and the system for the blade of the wind turbine according to the example embodiment will be described in further detail below.

Figure 3:
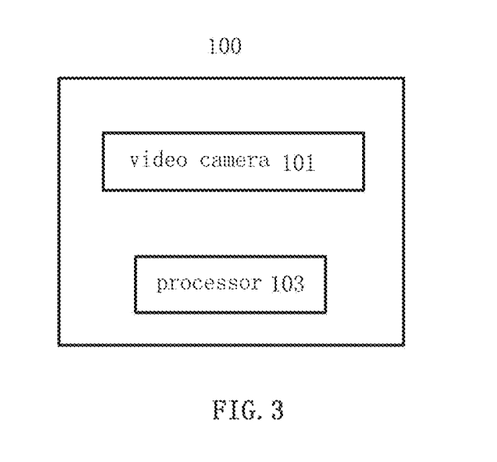
FIG. 3 shows a diagram of a video monitoring system for a blade of a wind turbine according to an example embodiment.

FIG. 3 shows a diagram of a video monitoring system 100 for a blade of a wind turbine according to an example embodiment.

Referring to FIG. 3, the system 100 according to the example embodiment may include a video camera 101 and a processor 103.

As described above, the video camera 101 may be a camera, preferably a PTZ camera rotating by 360 degrees. According to the example embodiment, as shown in FIG. 2B, the video camera 101 is mounted at a top of a nacelle of the wind turbine, preferably the video camera is mounted on a wind measurement bracket at the top of the nacelle of the wind turbine.

In one example embodiment, when blades of the wind turbine are in a stationary state, the processor 103 may calculate a shooting angle of the video camera, i.e., a pan (P, Pan) value and a tilt (T, Tilt) value of a video shooting angle, where the pan value P indicates a left and right control angle of the video camera and the tilt value T indicates a vertical control angle of the video camera.

Specifically, the processor 103 may be configured to calculate the pan value and the tilt value based on each of a plurality of circular arc angles, when the blades of the wind turbine are in a stationary state. According to the example embodiment, the plurality of circular arc angles are set based on a circular curve on a rotational plane of the blades, which is formed with a first point as a center and a first distance as a radius, where the first point is an intersection of a spindle of the wind turbine with the rotational plane of the blades, and the first distance is a distance from the first point to a monitoring part on the blades. An operation that the processor 103 calculates the pan value and the tilt value will be described in detail later with reference to FIG. 4.

In this case, the video recorder 101 adjusts the pan value and the tilt value to the pan value and the tilt value calculated by the processor 103, respectively, to capture the blades. According to the example embodiment, the processor 103 may also set a zoom factor of the video camera 101 to a Zooming value (Z, Zoom) preset for the monitoring part. The setting of the Zooming value Z will be described in detail later.

In one example embodiment, when the blades are in a state of motion, the processor 103 may, based on a position of the monitoring part in the blades, set the pan value and the tilt value of the video camera to a particular pan value and tilt value. According to the example embodiment, the monitoring part may include one or more of the following parts: a blade root, an upper housing of a blade wing, a lower housing of the blade wing, and blade tips of the upper and lower housings. Usually, in order to monitor the overall status of the blades, it is necessary to capture all of the aforementioned parts.

In this case, the video camera 101 adjusts the pan value and the tilt value to the particular pan value and tilt value set by the processor 103 to capture the blades. For example, the particular pan value and tilt value can be set for different monitoring parts depending on the model of the wind turbine and the sizes of the blades. In other words, according to the example embodiment of the disclosure, the video camera captures the blade in segments for each monitoring part.

Table 1 below lists the particular pan value, tilt value and zooming value set for different monitoring parts.

| NO. | P | T | Z | monitoring part |
| --- | --- | --- | --- | --- |
| 1 | 14 | 19 | 1 | an upper housing of the blade wing |
| 2 | 358 | 27 | 7 | a blade tip of the upper housing |
| 3 | 131 | 27 | 1 | a lower housing of the blade wing |
| 4 | 157 | 27 | 10 | a blade tip of the lower housing |

In Table 1, the zooming value Z set for the monitoring part can also be applied to the zoom factor of the video camera when the blade is in the stationary state. The values shown in Table 1 are only embodiments listed for specific PTZ values set for a wind turbine of a specific model, and the disclosure is not limited thereto.

According to the example embodiment of the disclosure, when the blades are in the stationary state or in the state of motion, the video camera adjusts the zoom factor adaptively for the different monitoring parts, enlarges and clearly capture the blade tips which are difficult to monitor, and may normally capture the blade wings. Specifically, if the monitoring part is the tip of the blade, the zooming value is a value greater than 1 (e.g., 7 or 10 in Table 1), so as to enlarge and capture the blade tip; if the monitoring part is the blade wing, the zooming value is 1, so as to normally capture the blade wing. However, this is only exemplary, and the zoom factor of the video camera 101 may achieve automatic zooming to automatically obtain a clear image of the monitoring part.

Figure 4:
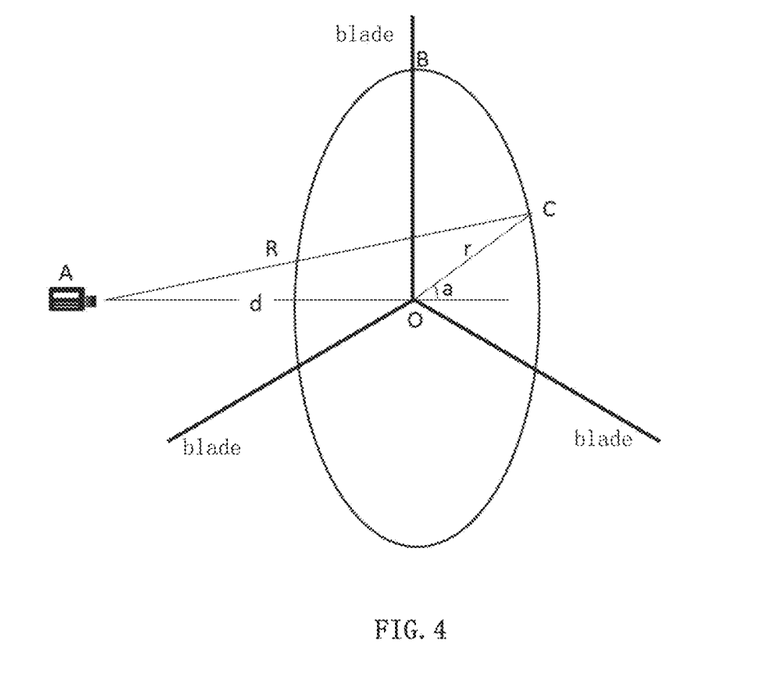
FIG. 4 shows a schematic diagram for calculating a pan value and a tilt value when blades are stationary.

FIG. 4 shows a schematic diagram for calculating a pan value and a tilt value when blades are stationary.

When the blades are stationary (i.e., a wind turbine shutdowns), the blades may not captured at a specified position, and in this case it is necessary to control the video camera to search and capture the blades along a fixed circular arc curve, i.e., a cruise along a circular arc curve. For example, a small circular arc curve is required if the blade root is captured, and a large circular arc curve is required if the blade tip is captured.

FIG. 4 shows the blades are in an inverted Y-shape in a stationary state, however this is only exemplary, the blades of the wind turbine can be in any position when the wind turbine shutdowns, but the blades are in a feathering state.

Referring to FIG. 4, point A indicates a position of the video camera (preferably, the point can be an optic center of the video camera); point O can be referred to as the first point described with reference to FIG. 3, i.e., the intersection of the spindle of the wind turbine with the rotational plane of the blades; point B may be referred to as a point to which a monitoring part on the blades corresponds, and point B may vary as the monitoring part varies; a distance from the first point O to the monitoring part B on the blade is a first distance r. In the rotational plane of the blades, a circular arc curve is formed with the first point O as a center and the first distance r as a radius.

The circular arc angle a is a circular arc angle set based on the circular arc curve. According to the example embodiment of the disclosure, one circular arc angle a corresponds to one shooting angle of the video camera (i.e., a pan value and a tilt value). Thus, setting a plurality of circular arc angles based on the circular arc curve corresponds to continually adjusting the video camera with a plurality of shooting angles to capture the blades, i.e., controlling the video camera to search and capture the blades along a fixed circular arc curve.

Referring to FIG. 4, point C may be referred to as a second point, which indicates a shooting point on the circular arc curve corresponding to the corresponding circular arc angle. The second point C may vary as the circular arc angle varies. In other words, a position of the second point C shown in FIG. 4 indicates a shooting point when the video camera does not capture the blades. The second point C may coincide with point B when the video camera just captures the blades.

According to the example embodiment of the disclosure, the processor 103 may calculate the pan value and the tilt value corresponding to each of the plurality of circular arc angles, based on a geometric relationship among the first distance r, a second distance d from the video camera A to the first point O and a third distance R from the video camera A to the second point C, a relationship among the pan value P, the tilt value T, the first distance r and the third distance R, as well as a relationship among each of the plurality of circular arc angles and the pan value and the tilt value of the video camera.

Specifically, the processor 103 may calculate the pan value P and the tilt value T corresponding to each circular arc angle a according to the following expressions (1) through (3).

$$d^2 + r^2 = R^2 \quad (1)$$

$$(\sin(P) \times R)^2 + (\sin(T) \times R)^2 = r^2 \quad (2)$$

$$\sin(P)/\sin(T) = \tan(a) \quad (3)$$

The expression (1) denotes the geometric relationship among the first distance r, the second distance d from the video camera A to the first point O and the third distance R from the video camera A to the second point C, the expression (2) denotes the relationship among the pan value P, the tilt value T, the first distance r and the third distance R, and the expression (3) denotes the relationship among the circular arc angles and the pan value and the tilt value of the video camera. The expressions (1) through (3) are only optimal examples of the disclosure, however, the disclosure is not limited thereto.

In one example embodiment, the circular arc angle a of 0 degree indicates a vertical downward direction (i.e., a direction of a tower). In this case, due to a position limitation of the video camera, the circular arc angle a is set within a range of −45 degree to 225 degree based on engineering practice experience, such that it can ensure that the video camera can scan (i.e., capture) at least two blades.

According to the expressions (1) through (3), the pan value P and the tilt value T corresponding to any angle a can be calculated. In one example embodiment, at the circular arc angle a=−45 degree at which the video camera begins shooting, it can be calculated that $\sin(p)=-r/2R$, $\sin(T)=-\sin(P)=r/2R$; at the circular arc angle a=225 degree at which the video camera ends shooting, it can be calculated that $\sin(p)=r/2R$, $\sin(T)=-\sin(P)=r/2R$. In one embodiment, in $\tan(a)$, the value of a is taken with a cycle of 180 (i.e., −90 to 90) degree, P or T in $\sin(P)$ or $\sin(T)$ is taken with a cycle of 360 degree, e.g., $\tan(a)$ equals to −1 for both a=−45 degree and a=135 degree, and in this case there are two cases for $\sin(P)/\sin(T)=\tan(a)=-1$: case 1 in which $\sin(P)$ is a positive value and $\sin(T)$ is a negative value; case 2 in which $\sin(P)$ is a negative value and $\sin(T)$ is a positive value. At this time, it can be determined whether $\sin(P)$ and $\sin(T)$ apply to case 1 or case 2 based on whether a is −45 degree or 135 degree.

FIGS. 5A to 5D show images obtained by performing a fixed-point segmentation shooting in a state of motion of a blade according to an example embodiment.

Figure 5A:
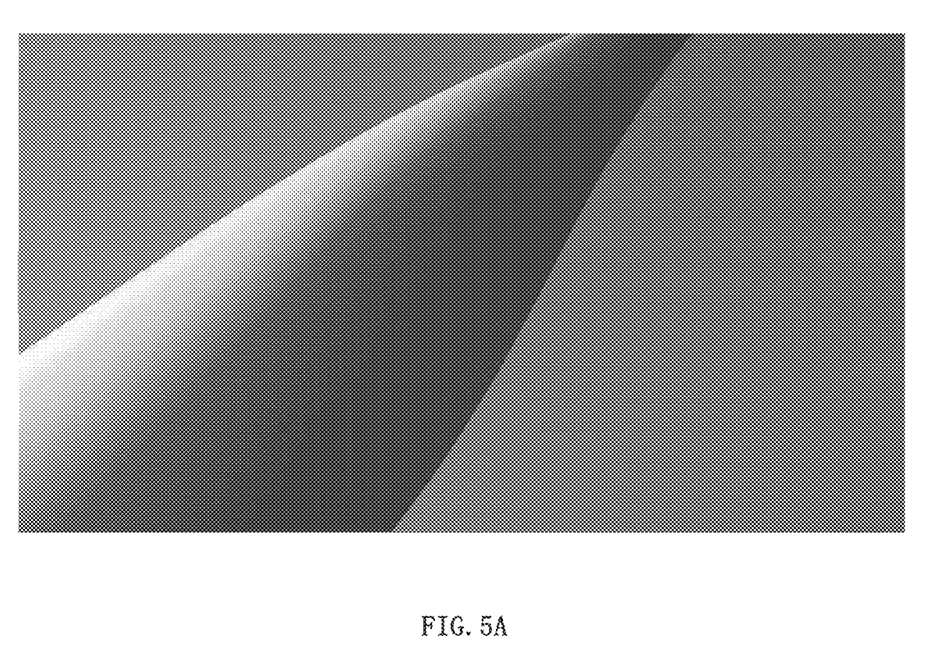
FIGS. 5A to 5D show images obtained by performing a fixed-point segmentation shooting in a state of motion of a blade according to an example embodiment.
Figure 5B:
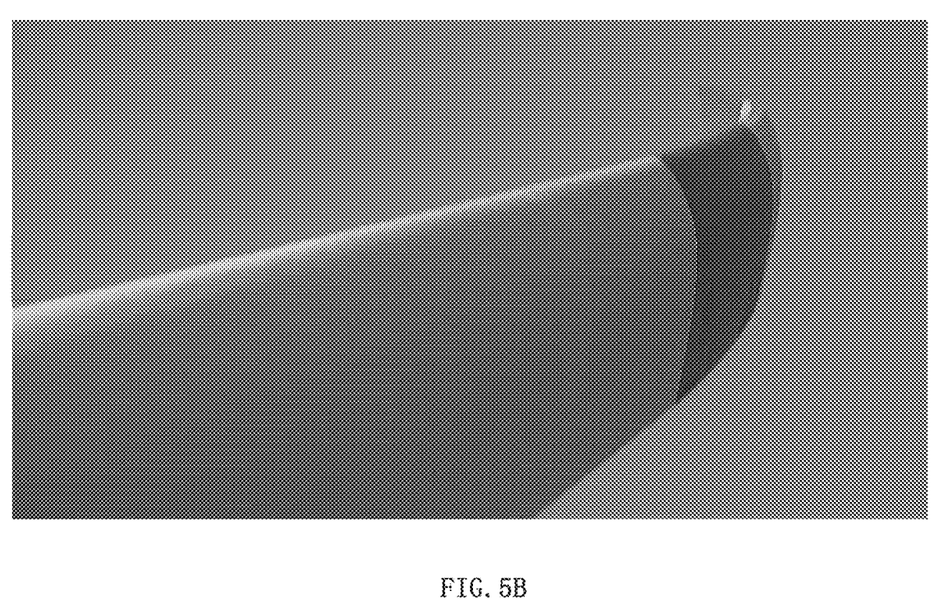
Figure 5C:
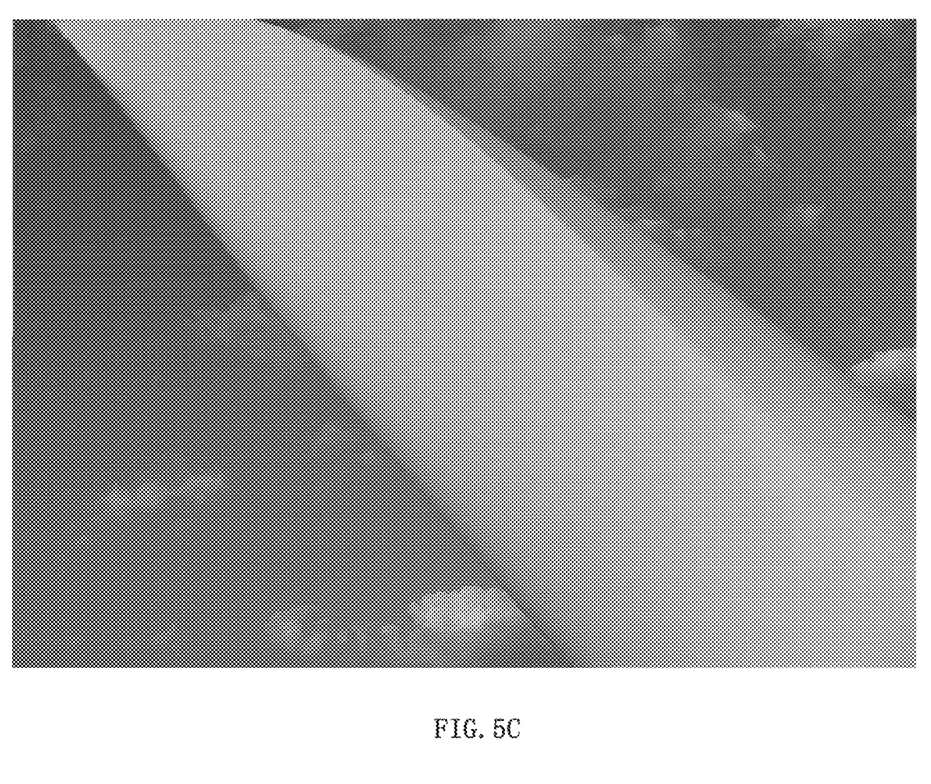
Figure 5D:
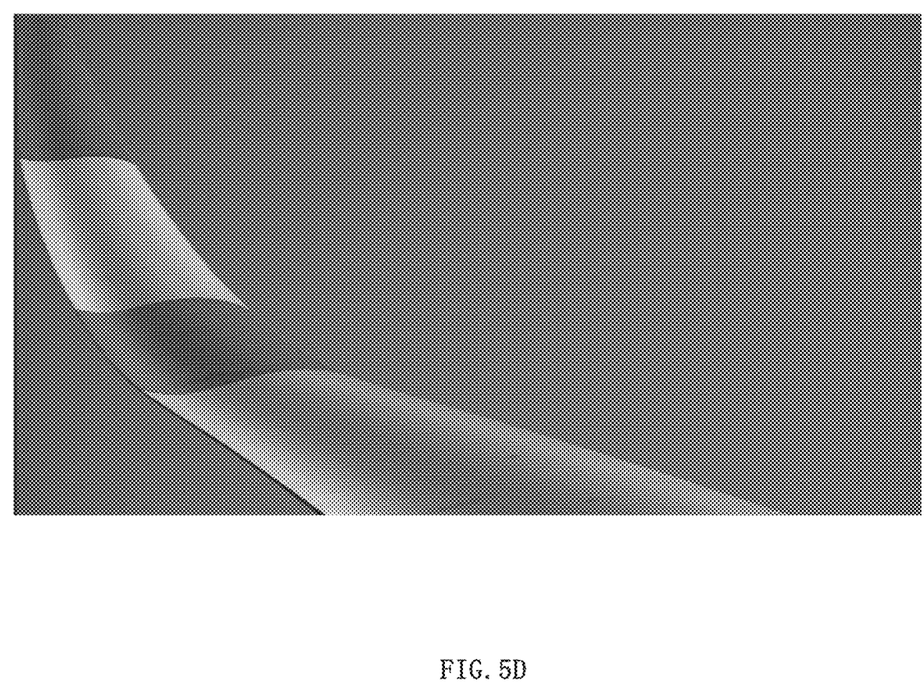

As an example, and in conjunction with Table 1, FIGS. 5A to 5D show images of blades captured with respect to a wind turbine of a specific model when a specific pan value P, a specific tilt value T and a specific zoom factor Z are set for different monitoring parts in the state of motion of the blade, respectively. For example, FIG. 5A shows an image obtained by capturing a upper housing of the blade when PTZ of the video camera is set to "P=14, T=19 and Z=1"; FIG. 5B shows an image obtained by capturing a tip of the upper housing of the blade when the PTZ of the video camera is set to "P=358, T=27 and Z=7" respectively; FIG. 5C shows an image obtained by capturing a lower housing of the blade when the PTZ of the video camera is set to "P=131, T=27 and Z=1" respectively; and FIG. 5D shows an image obtained by capturing a tip of the lower housing of the blade when the PTZ of the video camera is set to "P=157, T=27 and Z=10" respectively.

Figure 6:
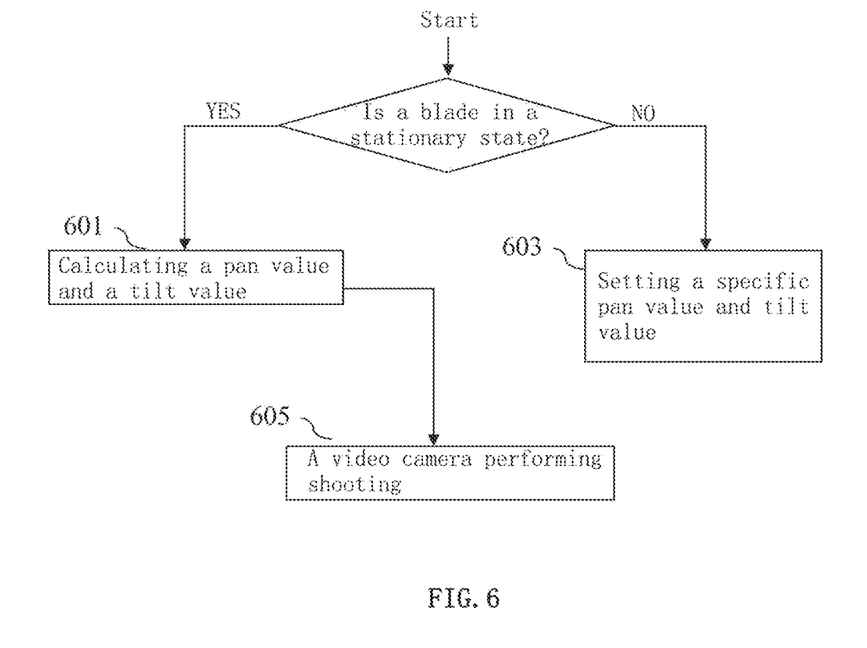
FIG. 6 shows a diagram of a video monitoring method for a blade of a wind turbine according to an example embodiment.

FIG. 6 shows a diagram of a video monitoring method for a blade of a wind turbine according to an example embodiment.

The video camera may be mounted at the top of the nacelle of the wind turbine as shown in FIG. 2B, preferably mounted on the wind measurement bracket at the top of the nacelle of the wind turbine generator set.

Referring to FIG. 6, in step 601, when the blade of the wind turbine is in a stationary state, a pan value and a tilt value of the video camera are calculated. Specifically, the pan value and the tilt value are calculated based on each of a plurality of circular arc angles, where the plurality of circular arc angles are set based on a circular arc curve on a rotational plane of the blade, which is formed with a first point as a center and a first distance as a radius, where the first point is an intersection of a spindle of the wind turbine generator with the rotational plane of the blade, and the first distance is a distance from the first point to a monitoring part on the blade. Then, in step 605, the pan value and the tilt value of the video camera are set to the calculated pan value and tilt value, respectively, to capture the blade.

In step 603, when the blade is in a state of motion, the pan value and the tilt value of the video camera are set to a specific pan value and tilt value according to a position of the monitoring part in the blade, to capture the blade.

The operation of the processor 103 for calculating the pan value and the tilt value and the setting of the zoom factor of the video camera described above with reference to FIGS. 3 and 4 are also applicable to the method of FIG. 6, and repetitive description thereof is omitted here for brevity.

The video monitoring method and system for the blade of the wind turbine according to the example embodiment are capable of capturing the blade when the blade is in a stationary state and in a state of motion respectively, performing the fixed-point segmentation shooting when the blade is in the state of motion, and performing the shooting according to a motion trajectory when the blade is in the stationary state; thereby simply and quickly capturing a clear maximum area of the blade or capturing an outer surface of an entire blade body.

Various steps of the method described in FIG. 6 and operations of the processor described in FIG. 3 may be written as programs and software according to the example embodiments of the disclosure. The programs and software can be written by using any programming language based on the block diagrams and the flow charts illustrated in the drawings and the corresponding descriptions in the specification. In one example, the programs or software may include machine code that is directly executed by one or more processors or computers, such as machine code produced by a compiler. In another example, the programs or software include higher-level code that is executed by the one or more processors or computers using an interpreter. The programs or software may be recorded, stored, or fixed in one or more non-transitory computer-readable storage media. In one example, the programs or software, or the one or more non-transitory computer-readable storage media may be distributed over computer systems.

The various steps of the method described in FIG. 6 and the operations of the processor described in FIG. 3 may be implemented on a computing device including a processor and a memory according to the example embodiments of the disclosure. The memory stores program instructions for controlling the processor to implement operations of various units as described above.

While specific example embodiments of the disclosure have been described referring to FIGS. 1-6, modifications may be made to the disclosure in various forms without departing from the spirit and scope of the disclosure. Suitable results may be achieved if the described techniques are performed in a different order, and/or if components in a described system, architecture, or device are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A video monitoring method for a blade of a wind turbine, comprising:

calculating a pan value and a tilt value based on each of a plurality of circular arc angles when the blade of the wind turbine is in a stationary state, wherein the plurality of circular arc angles are set based on a circular arc curve on a rotational plane of the blade, which is formed with a first point as a center and a first distance as a radius, wherein the first point is an intersection of a spindle of the wind turbine with the rotational plane of the blade, and the first distance is a distance from the first point to a monitoring part on the blade; and setting the pan value and the tilt value of a video camera to the calculated pan value and tilt value, respectively, to capture the blade.

2. The method of claim 1, further comprising:
setting the pan value and the tilt value of the video camera to a specific pan value and tilt value according to a position of the monitoring part in the blade when the blade is in a state of motion, to capture the blade.

3. The method of claim 1, wherein the monitoring part comprises one or more of:
a blade root, an upper housing of a blade wing, a lower housing of the blade wing, a blade tip of the upper housing, and a blade tip of the lower housing.

4. The method of claim 3, further comprising:
setting a zoom factor of the video camera to a zooming value preset for the monitoring part to capture the blade.

5. The method of claim 4, wherein in case of the monitoring part being the blade tip of the blade, the zooming value is a value greater than 1.

6. The method of claim 4, wherein in case of the monitoring part being the blade wing of the blade, the zooming value is 1.

7. The method of claim 1, wherein the calculating of e pan value and the tilt value comprises:
calculating the pan value and the tilt value corresponding to each of the plurality of circular arc angles, based on a geo c relationship among the first distance, a second distance from the video camera to the first point and a third distance from the video camera to a second point, a relationship among the pan value, the tilt value, the first distance and the third distance, as well as a relationship among each of the plurality of circular arc angles and the pan value and the tilt value of the video camera, wherein the second point is a shooting point on the circular arc curve corresponding to the corresponding circular arc angle.

8. The method of claim 1, wherein the video camera is mounted at a top of a nacelle of the wind turbine.

9. The method of claim 8, wherein the video camera is mounted on a wind measurement bracket at the top of the nacelle of the wind turbine.

10. The method of claim 1, wherein the plurality of circular arc angles are set in a range of −45 degree to 225 degree.

11. A non-transitory computer-readable storage medium storing program instructions that, when executed by a processor, cause the processor to perform the method of claim 1.

12. A video monitoring system for a blade of a wind turbine, comprising:

a video camera mounted at a top of a nacelle of the wind turbine; and a processor configured to: calculate a pan value and a tilt value based on each of a plurality of circular arc angles when the blade of the wind turbine is in a stationary state, wherein the plurality of circular arc angles are set based on a circular arc curve on a rotational plane of the blade, which is formed with a first point as a center and a first distance as a radius, wherein the first point is an intersection of a spindle of the wind turbine with the rotational plane of the blade, and the first distance is a distance from the first point to a monitoring part on the blade; and wherein the video camera adjusts the pan value and the tilt value to the pan value and the tilt value calculated by the processor, respectively, to capture the blade.

13. The system of claim 12, wherein the video camera is mounted on a wind measurement bracket at the top of the nacelle of the wind turbine.

14. The system of claim 12, wherein the processor is further configured to:
set the pan value and the tilt value of the video camera to a specific pan value and tilt value according to a position of the monitoring part in the blade when the blade is in a state of motion;
wherein the video camera adjusts the pan value and the tilt value as the specific pan value and tilt value to capture the blade.

15. The system of claim 12, wherein the monitoring part comprises one or more of:
a blade root, an upper housing of a blade wing, a lower housing of the blade wing, a blade tip of the upper housing, and a blade tip of the lower housing.

16. The system of claim 15, wherein the processor is further configured to:
set a zoom factor of the video camera to a zooming value preset for the monitoring part.

17. The system of claim 16, wherein in case of the monitoring part being the blade tip of the blade, the zooming value is a value greater than 1.

18. The system of claim 16, wherein in case of the monitoring part being the blade wing of the blade, the zooming value is 1.

19. The system of claim 12, wherein the processor is further configured to:
calculate the pan value and the tilt value corresponding to each of the plurality of circular arc angles, based on a geometric relationship among the first distance, a second distance from the video camera to the first point and a third distance from the video camera to a second point, a relationship among the pan value, the tilt value, the first distance and the third distance, as well as a relationship among each of the plurality of circular arc angles and the pan value and the tilt value of the video camera, wherein the second point is a shooting point on the circular arc curve corresponding to the corresponding circular arc angle.

20. The system of claim 12, wherein the processor sets the plurality of circular arc angles in a range of −45 degree to 225 degree.

\* \* \* \* \*